Dec. 20, 1966  NOBUHIKO KITAYAMA  3,292,285
FOLDABLE FRAME STRUCTURE FOR FILM FRAMES OR FILM MOUNTS
Filed April 9, 1964  2 Sheets-Sheet 1

INVENTOR.
NOBUHIKO KITAYAMA.
BY
ATTY.

Dec. 20, 1966  NOBUHIKO KITAYAMA  3,292,285
FOLDABLE FRAME STRUCTURE FOR FILM FRAMES OR FILM MOUNTS
Filed April 9, 1964  2 Sheets-Sheet 2

INVENTOR.
NOBUHIKO KITAYAMA.
BY

United States Patent Office 3,292,285
Patented Dec. 20, 1966

3,292,285
FOLDABLE FRAME STRUCTURE FOR FILM
FRAMES OR FILM MOUNTS
Nobuhiko Kitayama, 29 Asakusa Kojima-cho 1-chome,
Taito-ku, Tokyo, Japan
Filed Apr. 9, 1964, Ser. No. 358,602
Claims priority, application Japan, Apr. 18, 1963,
38/20,346
3 Claims. (Cl. 40—64)

This invention relates to a foldable frame structure for film frames or film mounts.

The film mounts in prior art have been inconvenient to use in that, when they are used with a projector, each of the film mounts must be individually positioned to the up and down or the right and left direction of the image supported thereon each time the order of the projection thereof is to be determined and arranged in succession, and, in case of utilizing a projector provided with a so-called autochanger, the thus arranged film mounts must be loaded in order in the magazine, and, in case of utilizing types of projector other than the above, each of the film mounts must be inserted into and discharged from the projector successively. Further, it is very difficult to keep the thus arranged order of the film mounts in so arranged succession and to locate them in proper position orientation in the up and down or the right and left direction with respect to the images in the film mounts. And each time the projector is used, the above mentioned troublesome and time consuming procedure for arranging the film mounts must be repeated. Further, the projector provided with a loading magazine has disadvantages in that it is expensive and the space of the projector becomes necessarily large.

This invention provides a frame structure for the film frames or film mounts in which a plurality of individual frame elements are swingably connected with each other by means of connecting members to form a chain-like succession, each of said frame elements supporting directly a film frame or a film mount supporting the film frame therein, the distance between two adjacent axes in the connecting member for swinging the frame element connected thereto being made equal to or slightly larger than the thickness of each frame element so that the frame structure assembly can be folded freely in zig-zag form in contact with each other. The frame structure assembly thus formed in accordance with the invention facilitates the operation of the projector. Moreover, in accordance with another feature of the invention, each of the frame elements connected in series can be disconnected and rearranged in any desired order and orientation of the frame element with regard to the up and down or the right and left direction of the image supported in the film frame attached to the frame element, so that the compilation of the frame structure to be made previously can be effected very easily, while the maintenance of the film after the usage with the projector can be made efficiently. With the frame structure in accordance with the invention, a projector utilizing so-called autochanger which is provided with expensive magazine becomes unnecessary, hence a small and simple projector can be used with the frame structure in accordance with the invention, and, since the frame structure in accordance with the invention is constructed in a chain-like succession of frame elements connected in series, it can be automatically transported during the operation of a projector by means of a sprocket wheel or the like provided in the projector.

Therefore, one object of the invention is to provide a frame structure comprising a plurality of frame elements each for supporting a film frame, said elements being swingably connected with each other by means of connecting members so as to form a chain-like succession of frame elements foldable in zig-zag form.

Another object of the invention is to provide a frame structure comprising a plurality of frame elements each for supporting a film mount mounting the film frame therein, said elements being swingably connected with each other by means of connecting members so as to form a chain-like succession of the frame elements foldable in zig-zag form.

Still another object of this invention is to provide a frame structure with the above feature, wherein any of the frame elements can be disconnected and connected again to change the order in succession or to change the orientation of the frame element in up and down or left and right direction.

Still another object of the invention is to provide a frame structure having a plurality of frame elements swingably connected with each other by means of connecting members integrally molded with frame elements of synthetic material so as to form, chain-like series, each of said elements being adapted to support a film frame or a film mount mounting the film frame therein.

These and other objects, features and advantages of the invention will be explained and made more apparent by referring to the following description taken in conjunction with the accompanying drawings, in which.

Figure 1:
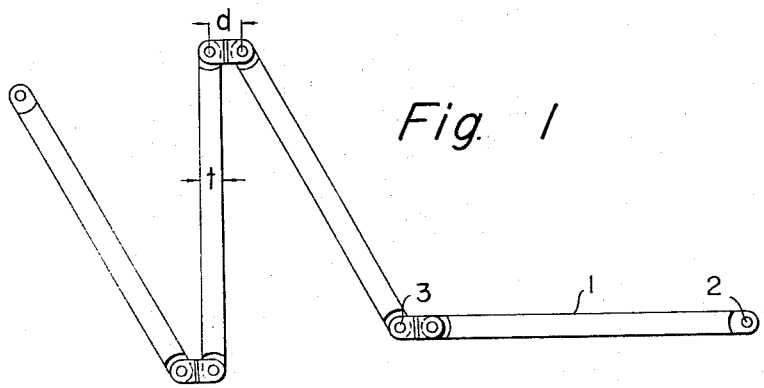
FIG. 1 is a side elevation showing a type of the frame structure of the present invention, in which each frame element is swingably connected to each other with its depressed holes engaged with protuberances formed on an elastic plate spring member.
Figure 2:
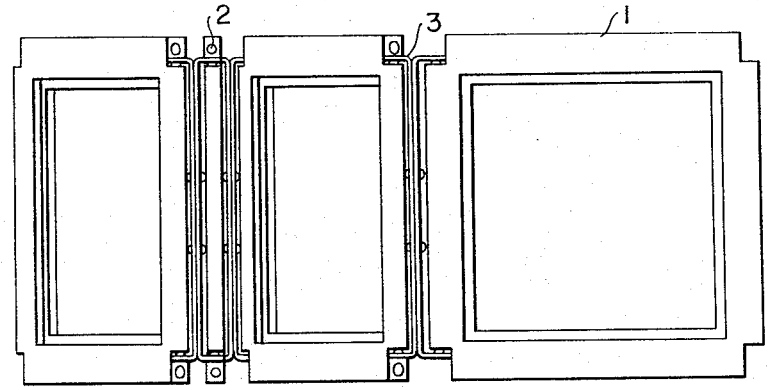
FIG. 2 is a plan view of the frame structure of FIG. 1.
Figure 3:
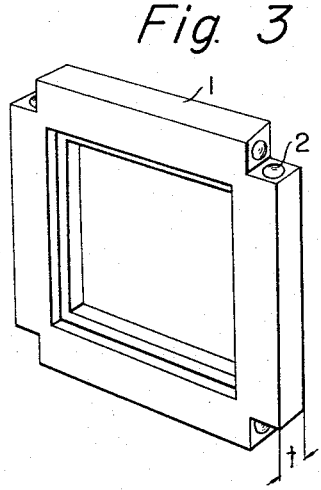
FIG. 3 is a perspective view showing the frame element of the frame structure shown in FIG. 1.
Figure 4:
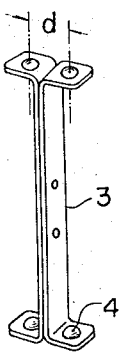
FIG. 4 is a perspective view showing the elastic plate spring member for swingably connecting the frame elements with each other to form foldable frame structure.
Figure 5:
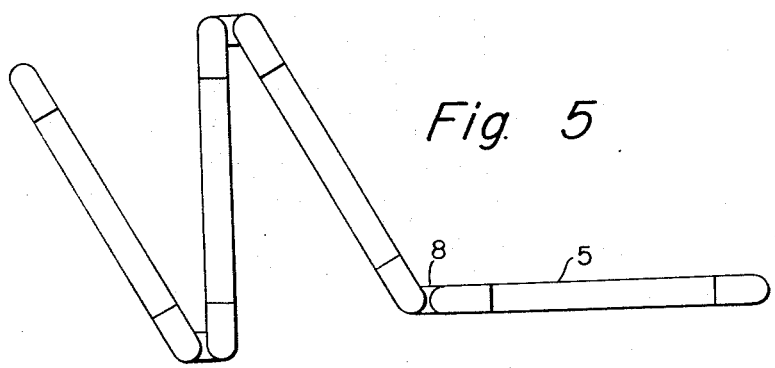
FIG. 5 is a side elevation showing another type of the frame structure in which the construction for engaging the frame element with the elastic plate spring member is conversely constructed to the engagement shown in FIG. 1.
Figure 6:
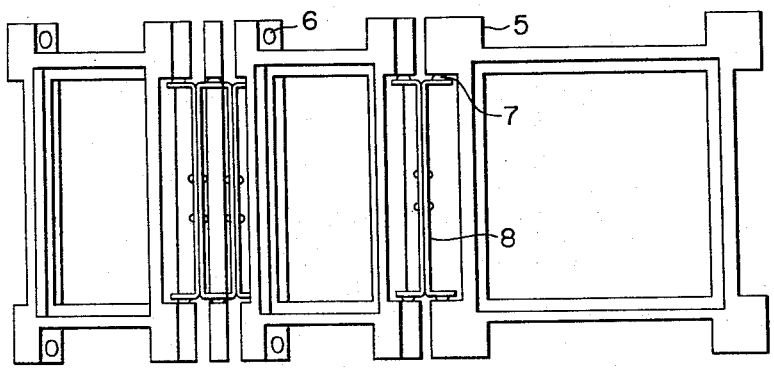
FIG. 6 is a plan view of the frame structure shown in FIG. 5.
Figure 7:
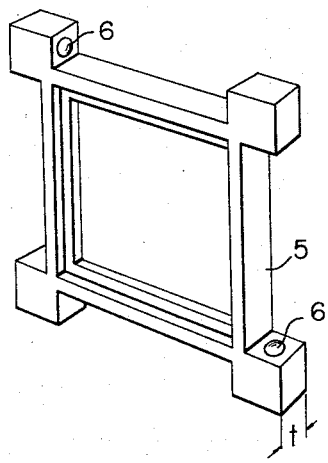
FIG. 7 is a perspective view of the frame element shown in FIG. 6.
Figure 8:
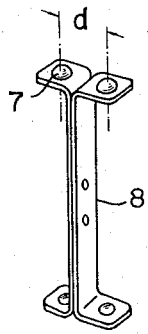
FIG. 8 is a perspective view of the elastic plate spring member used in the frame structure of FIG. 6 for connecting the frame elements with each other.

Referring now to FIGS. 1, 2, 3 and 4, there is shown a first embodiment of the invention. The reference numeral 1 designates a frame element being shaped in a square form having a concentric square opening therein provided with rectangular grooves along each of the sides of said square opening for supporting a film frame or a film mount mounting the film frame therein. On each corner of the outer sides of said element is provided a rectangular recess, each face of said recess being parallel to one of the outer sides of said element, and being provided with a small semispherical recess 2, as shown in FIGS. 2 and 3. For connecting the frame elements 1 with each other, there are provided a plurality of connecting members 3 as shown in FIG. 4, which are made of two elastic metal strips in U-form, that is strips having each end bent to form lugs extending therefrom at substantially a right angle, said strips being fixed together to form an I shape, or which are made of elastic synthetic material integrally molded to form said I shape. On each of the inner surfaces of the bent portions at both ends of said I shaped connecting member 3 is provided a small projection 4, which is adapted to engage with the recess 2 for connecting the frame elements 1 with each other to form a chain-like frame construction. Because of the square shape of the frame element 1, the connecting member 3 can be fitted with any of the sides of said frame element 1, so that the positioning orientation of the frame element with regard to up and down direction can be freely changed to left and right direction, and the order of the connection of the frame elements 1 can freely be interchanged, and also any desired number of the frame elements 1 can be connected. The distance $d$ between the two projections 4, as shown in FIG. 4, is selected to be equal to or slightly larger than the thickness $t$ of each of the frame elements 1 so that the connected frame structure can be folded freely in zig-zag form. The position of the semispherical recess 2 relative to the outer edges of the surface of the rectangular recess in which said semispherical recess is provided is so determined to enable the folding of the frame elements when connected by means of the connecting member 3. Though the outer side surface of the frame element 1 is shown as flat in FIG. 3, the side surface can be formed in cylindrical shape as shown in FIG. 1.

In FIGS. 5, 6, 7 and 8, there is shown a second embodiment of the invention. In this embodiment, the intermediate portion of each of the outer sides of the frame element 5 is cut out to form a U-formed or rectangular recess, and on each of the opposite side surfaces of said rectangular recesses is provided a semispherical recess 6. For connecting the frame elements 5 with each other, there are provided a plurality of connecting members 8, the shape of which is similar to the connecting member 3 of the first embodiment except the direction of the projections 7 which are provided on each of the outer surfaces bent out at both ends of said connecting member 8, so that said projection can engage with the recess 6 of the frame element 5 to form a series of chain-like frame structure.

The function of the frame structure of this second embodiment is similar to that of the first embodiment.

This invention has been described referring to particular embodiments as illustrated, but it is not intended to be limited to such embodiments but to all systems in which each of the frame elements flexibly connected to adjacent frame elements can freely be bent in zig-zag form in contact with the adjacent frame elements by satisfying the following relationship in the dimensions:

$$d \geqq t$$

wherein $d$ distance between two centers of pivot of the connecting member $t$ thickness of the frame element.

What is claimed is:

1. Foldable frame structure comprising a plurality of parallel frame elements having first pairs of connecting members engaging surface means for detachably engaging connecting members when the lateral frame element edges are adjacent the connecting members, second pairs of connecting members engaging surface means for detachably engaging connecting members when a frame element has been rotated to place the upper and lower frame element edges adjacent the connecting members, a connecting member interposed between adjacent frame elements and swingably engaging a first pair of connecting member engaging surface means on each of the adjacent frame elements by means of a pair of recess-projection connections, each pair of the recess-projection connections defining an axis, the thickness of said frame elements and the distance between the two axes taken in said connecting member for swingably engaging the two frame elements adjacent thereto having dimensions satisfying the relation $$d = t$$

2. Foldable frame structure comprising a plurality of parallel frame elements having a square outer shape, each corner of the square shape having a rectangularly recessed portion having two faces each parallel to the side surfaces of the outer shape, each of said faces of said recessed portions being provided with a recess, a resilient connecting member interposed between adjacent frame elements, each connecting member having small projections each engaging with a recess in said adjacent frame elements so as to connect the connecting member to any of the sides of said adjacent frame elements, thereby enabling the swinging of said adjacent frame elements relative to said connecting member about respective axes, the thickness of said frame element and the distance between the two axes taken in said connecting member for swingably engaging the two frame elements adjacent thereto having dimensions satisfying the relation $$d = t$$

3. Foldable frame structure comprising a plurality of parallel frame elements having a square outer shape, each side of said outer shape being recessed in the intermediate position to a rectangular U-form with the faces parallel to the side surfaces of said outer shape, each of the opposite faces of said rectangular recesses being provided with a semi-circular recess, a resilient connecting member interposed between adjacent frame elements, each connecting member having small projections each engaging with a semi-circular recess in said adjacent frame elements so as to connect the connecting member to any of the sides of said adjacent frame elements, thereby enabling the swinging of said adjacent frame elements relative to said connecting member about respective axes, the thickness $t$ of said frame elements and the distance $d$ between the two axes taken in said connecting member for swingably engaging the two frame elements adjacent thereto having dimensions satisfying the relation $$d = t$$

References Cited by the Examiner

UNITED STATES PATENTS

| | | | |
|---|---|---|---|
| 1,697,277 | 1/1929 | Hoopes | 160—135 X |
| 1,708,968 | 4/1929 | Gianelloni | 160—229 |
| 2,364,891 | 12/1944 | Cooper | 40—102 X |
| 2,740,326 | 4/1956 | Reineboch | 40—78 X |
| 2,856,713 | 10/1958 | Mosca | 40—64 |
| 2,938,227 | 5/1960 | Lhota | 160—206 X |

EUGENE R. CAPOZIO, *Primary Examiner.*

W. GRIEB, *Assistant Examiner.*